(12) United States Patent
Ishigaki et al.

(10) Patent No.: US 10,569,239 B2
(45) Date of Patent: Feb. 25, 2020

(54) CONTINUOUS EXTRUDING KNEADER FOR PRODUCING MIXTURE FOR ELECTRODE ACTIVE MATERIAL LAYER, AND METHOD FOR PRODUCING MIXTURE FOR ELECTRODE ACTIVE MATERIAL LAYER, ELECTRODE LAMINATE, AND ALL-SOLID-STATE BATTERY USING IT

(71) Applicant: TOYOTA JIDOSHA KABUSHIKI KAISHA, Toyota-shi, Aichi-ken (JP)

(72) Inventors: Yuki Ishigaki, Shizuoka-ken (JP); Hiroyuki Inoue, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 93 days.

(21) Appl. No.: 15/613,397

(22) Filed: Jun. 5, 2017

(65) Prior Publication Data
US 2017/0348652 A1    Dec. 7, 2017

(30) Foreign Application Priority Data

Jun. 6, 2016  (JP) ................................. 2016-112618
Jun. 1, 2017  (JP) ................................. 2017-109299

(51) Int. Cl.
*B01F 7/00*  (2006.01)
*B01F 7/08*  (2006.01)
*H01M 10/0585*  (2010.01)
*H01M 4/62*  (2006.01)
*B01F 3/14*  (2006.01)
(Continued)

(52) U.S. Cl.
CPC ............ *B01F 7/085* (2013.01); *B01F 3/1221* (2013.01); *B01F 3/14* (2013.01); *B01F 7/0065* (2013.01); *B01F 7/00416* (2013.01); *B01F 7/083* (2013.01); *H01M 4/625* (2013.01); *H01M 10/0585* (2013.01); *H01M 10/0562* (2013.01); *H01M 2300/0068* (2013.01)

(58) Field of Classification Search
CPC ........ B01F 7/085; B01F 7/088; B01F 3/1221; B01F 3/14; B01F 7/00416; B01F 7/0065; B01F 7/083; H01M 4/625; H01M 10/0585; H01M 10/0562; H01M 2300/0068
See application file for complete search history.

(56) References Cited

U.S. PATENT DOCUMENTS 3,524,730 A * 8/1970 Yuge Ko ................. B01F 7/085
366/149
2016/0052171 A1* 2/2016 Ogane ..................... B01F 7/083
366/83

FOREIGN PATENT DOCUMENTS

JP    2015-125877 A    7/2015

* cited by examiner

*Primary Examiner* — Anshu Bhatia
(74) *Attorney, Agent, or Firm* — Dickinson Wright PLLC

(57) ABSTRACT

A continuous extrusion kneader comprising a first supply section for supplying a solid electrolyte, a first kneading section for kneading a material supplied from the first supply section to provide an intermediate mixture, a second supply section for supplying an electrode active material to the intermediate mixture, and a second kneading section for kneading the intermediate mixture and the material supplied from the second supply section, wherein the first kneading section comprises a forward kneading section for kneading the material supplied from the first supply section and conveying the material downstream, and a reverse kneading section for kneading the material supplied from the forward kneading section and applying a force in the upstream direction.

8 Claims, 6 Drawing Sheets

(51) Int. Cl.
*B01F 3/12* (2006.01)
*H01M 10/0562* (2010.01)

FIG. 3
(a)
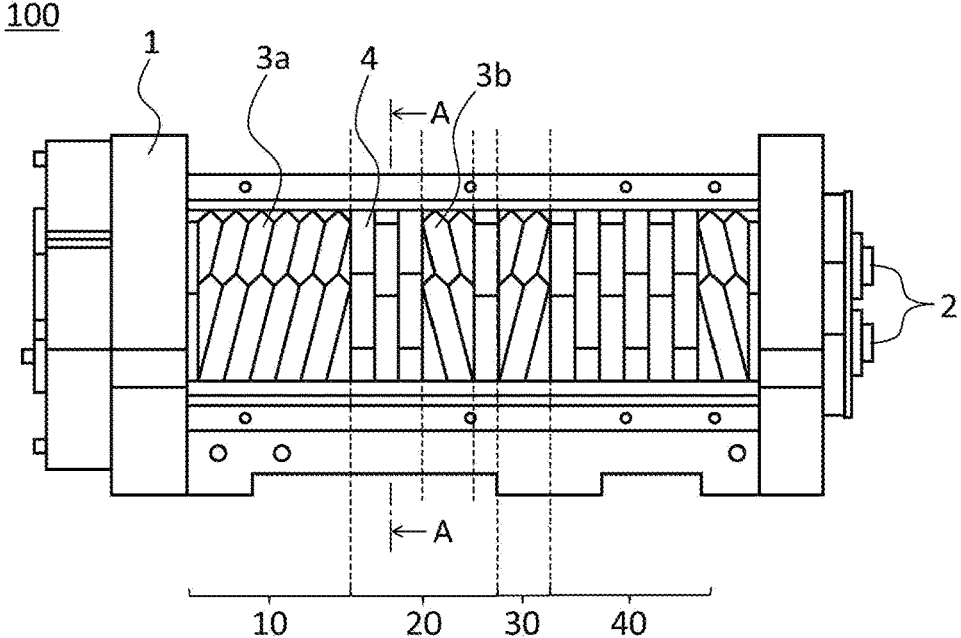
(b)
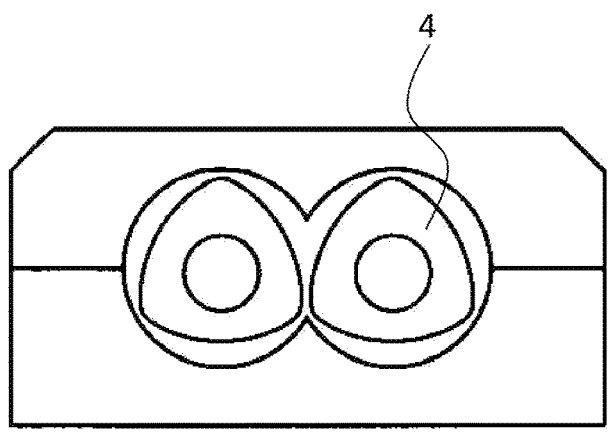
A-A CROSS-SECTION
(c)
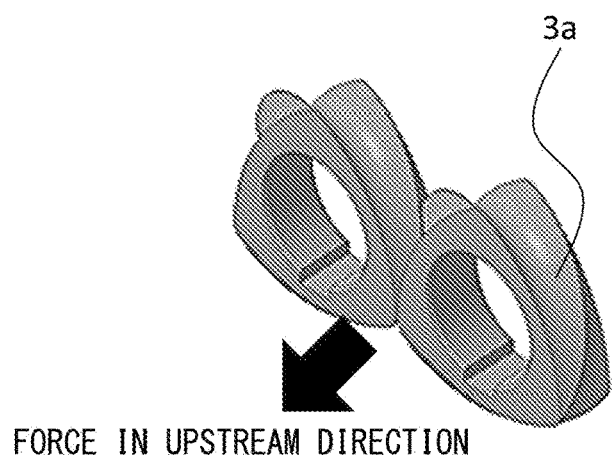
FORCE IN UPSTREAM DIRECTION

CONTINUOUS EXTRUDING KNEADER FOR PRODUCING MIXTURE FOR ELECTRODE ACTIVE MATERIAL LAYER, AND METHOD FOR PRODUCING MIXTURE FOR ELECTRODE ACTIVE MATERIAL LAYER, ELECTRODE LAMINATE, AND ALL-SOLID-STATE BATTERY USING IT

RELATED APPLICATIONS

This application claims priority to Japanese Patent Application No. 2016-112618, filed on Jun. 6, 2016, and Japanese Patent Application No. 2017-109299, filed Jun. 1, 2017, including the specifications, drawings and abstracts, the entire disclosures of which are incorporated herein by reference.

TECHNICAL FIELD

The present invention relates to a continuous extrusion kneader for producing a mixture for electrode active material layer of a battery, and methods using the continuous extrusion kneader for producing a mixture for electrode active material layer, an electrode laminate and an all-solid battery.

BACKGROUND ART

In recent years, it is required to develop a small, high-performance battery as a power source of automobiles, personal computers, mobile phones, and tablet computers, etc. As to such a battery, development of an all-solid battery using a solid electrolyte is being aggressively carried out in parallel with an electrolyte battery using a liquid electrolyte.

In general, an all-solid battery has, as one of structural elements, an electrode active material layer containing an electrode active material and a solid electrolyte, etc. The electrode active material as used herein indicates a cathode active material in a positive electrode and an anode active material in a negative electrode.

The production of an electrode active material layer comprises kneading materials such as electrode active material and solid electrolyte to provide a mixture, and the kneading is often performed using a continuous extrusion kneader. At the time of kneading, aggregation of materials is prevented generally by applying a high shear force to the materials such as solid electrolyte and electrode active material.

For example, Patent Document 1 describes a continuous extrusion kneader for producing a mixture for electrode active material layer, comprising, from upstream to downstream, a first kneading section for kneading a solid electrolyte supplied from a first supply section, and a second kneading section for kneading the solid electrolyte kneaded in the first kneading section and an active material newly supplied from a second supply section.

RELATED ART

Patent Document

[Patent Document 1] Japanese Unexamined Patent Publication No. 2015-125877

SUMMARY OF THE INVENTION

Technical Problem

In the kneading of a solid electrolyte, since primary particles of the solid electrolyte are a fine particles having diameters of 1 μm or less, particles are easy to aggregate, and the configuration of the conventional continuous extrusion kneader disclosed in Patent Document 1 assumes the possibility that the kneading of the solid electrolyte in the first kneading section becomes insufficient and the kneading of the produced mixture for electrode active material layer becomes insufficient.

Accordingly, an object of the present invention is to provide a continuous extrusion kneader for producing a sufficiently kneaded mixture for electrode active material layer.

Solution to Problem

As a result of many intensive studies to attain the object above, the present inventors have accomplished the present invention. The gist of the present invention is as follows.

<1> A continuous extrusion kneader for producing a mixture for electrode active material layer, comprising, from upstream toward downstream, a first supply section for supplying at least a part of a solid electrolyte, a first kneading section for kneading the material supplied from the first supply section to provide an intermediate mixture, a second supply section for supplying at least a part of an electrode active material to the intermediate mixture, and a second kneading section for kneading the intermediate mixture and the material supplied from the second supply section, wherein the first kneading section comprises a forward kneading section for kneading the material supplied from the first supply section and conveying the material downstream, and a reverse kneading section for kneading the material supplied from the forward kneading section and applying a force to the material in the upstream direction.

<2> The continuous extrusion kneader according to item <1>, wherein the first kneading section further comprises at least one additional kneading section on the downstream side relative to the reverse kneading section, and the additional kneading section comprises an additional forward kneading section for kneading the material supplied from the upstream and conveying the material downstream, and an additional reverse kneading section for kneading the material supplied from the additional forward kneading section and applying a force to the material in the upstream direction.

<3> The continuous extrusion kneader according to item <2>, wherein the first kneading section comprises a plurality of additional kneading sections.

<4> The continuous extrusion kneader according to any one of items <1> to <3>, further comprises, between the most downstream portion of the first kneading section and the most upstream portion of the second supply section, a material supply buffering section in which while kneading the material supplied from the first kneading section, the material during kneading is forced by the material supplied from the first kneading section to be conveyed to the second supply section.

<5> The continuous extrusion kneader according to any one of items <1> to <4>, wherein in the first supply section, at least one selected from an electrode active material, a conduction aid, a dispersion medium and a binder is further supplied, in addition to the solid electrolyte.

<6> The continuous extrusion kneader according to any one of items <1> to <5>, wherein in the second supply section, at least one selected from a solid electrolyte, a conduction aid, a dispersion medium and a binder is further supplied, in addition to the electrode active material.

<7> A method for producing a mixture for electrode active material layer by using the continuous extrusion kneader according to any one of items <1> to <6>, the method comprising:

letting at least a part of the solid electrolyte be supplied to the first supply section and kneaded in the first kneading section to provide an intermediate mixture, and letting at least a part of the electrode active material be supplied to the intermediate mixture in the second supply section and kneaded in the second kneading section to provide a mixture for electrode active material layer.

<8> A method for producing an electrode laminate having an electrode current collector and an electrode active material layer, the method comprising producing a mixture for electrode active material layer by the method according to item <7>, and applying the mixture for electrode active material layer onto the electrode current collector to provide an electrode active material layer.

<9> A method for producing an all-solid battery in which a cathode current collector, a cathode active material layer, a solid electrolyte layer, an anode active material layer, and an anode current collector are stacked in this order, the method comprising producing an electrode laminate having the electrode current collector and the electrode active material layer by the method according to <8>, and stacking the electrode laminate on the solid electrolyte layer.

Effects of the Invention

According to the present invention, a continuous extrusion kneader for producing a sufficiently kneaded mixture for electrode active material layer is provided.

BRIEF DESCRIPTION OF THE DRAWINGS

FIG. 3 A schematic diagram of the first kneading section in the continuous extrusion kneader according to the first embodiment of the present invention.

MODE FOR CARRYING OUT THE INVENTION

<<Continuous Extrusion Kneader>>

Figure 1:
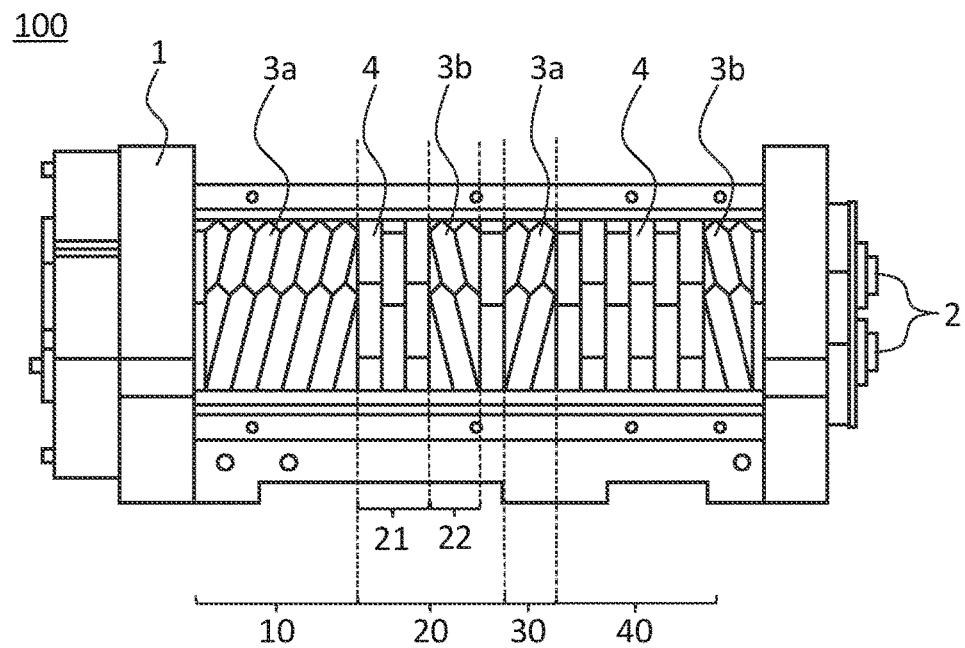
FIG. 1 A schematic diagram of the continuous extrusion kneader for producing a mixture for electrode active material layer according to a first embodiment of the present invention.

The continuous extrusion kneader generally has a hollow barrel and one or a plurality of rotary shafts provided at predetermined intervals within the barrel. The continuous extrusion kneader includes a single-screw continuous extrusion kneader and a multi-screw continuous extrusion kneader, for example, a twin-screw continuous extrusion kneader, a triple-screw extrusion kneader, etc.

The rotary shaft may have generally a screw mainly for conveying a material and a paddle, etc. mainly for kneading a material. The screw and paddle on the rotary shaft are rotated along with the rotation of the rotary shaft, and the continuous extrusion kneader can perform operations such as kneading, compression and temporary reverse conveyance while conveying from upstream to downstream the material supplied into the barrel and can continuously produce a kneaded mixture.

The paddle can knead a material by applying a shear force to the material. The shape of the paddle is not particularly limited, and a paddle having any shape such as circular, elliptic, substantially triangular or gear-shaped can be used. The paddle is sometimes called kneading, rotor, gear, etc.

In the continuous extrusion kneader, at the time of producing the mixture for an electrode active material layer by kneading the materials such as electrode active material and solid electrolyte, for obtaining a mixture having excellent dispersibility while reducing damage of the electrode active material, it is considered effective to increase the shear energy imparted to the solid electrolyte and reduce the shear energy imparted to the electrode active material.

Accordingly, kneading of a solid electrolyte must be sufficiently performed in the step of not containing an electrode active material.

However, the present inventors have discovered that only by providing, from upstream toward downstream, a first supply section for supplying a solid electrolyte and a first kneading section for kneading the supplied solid electrolyte as in the conventional continuous extrusion kneader, the filling factor of an intermediate mixture in the first kneading section cannot be increased and insufficient kneading of a solid electrolyte may be caused.

The continuous extrusion kneader of the present invention comprises,
from upstream toward downstream,
a first supply section for supplying at least a part of a solid electrolyte,
a first kneading section for kneading the material supplied from the first supply section to provide an intermediate mixture,
a second supply section for supplying at least a part of an electrode active material to the intermediate mixture, and
a second kneading section for kneading the intermediate mixture and the material supplied from the second supply section,
wherein the first kneading section comprises a forward kneading section for kneading the material supplied from the first supply section and conveying the material downstream, and a reverse kneading section for kneading the material supplied from the forward kneading section and applying a force to the material in the upstream direction.

In the continuous extrusion kneader of the present invention, by virtue of having the above-described configuration, the filling factor of the intermediate mixture in the first kneading section can be increased. More specifically, increase of the filling factor leads to enhancing the efficiency of shear energy and reducing the occurrence of pass-through in which the supplied material is not kneaded for a sufficient time within the barrel but is immediately discharged to the downstream side. As a result, the solid electrolyte can be sufficiently kneaded. For this reason, according to the continuous extrusion kneader of the present invention, a sufficiently kneaded mixture for electrode active material layer can be produced.

Next, the constituent features of the continuous extrusion kneader of the present invention are described. The continuous extrusion kneader of the present invention comprises a first supply section, a first kneading section, a second supply section, and a second kneading section in this order from upstream to downstream. Respective sections are described below.

<First Supply Section>

In the present invention, the first supply section indicates a section that is located on the upstream side relative to the first kneading section and can perform supply of a material. In the first supply section, at least a part of a solid electrolyte can be supplied into the barrel, and optionally at least a part of other materials such as electrode active material, conduction aid, dispersion medium and binder can be supplied.

The material supplied into the barrel in the first supply section can be conveyed to the first kneading section by a screw, etc. on the rotary shaft.

<First Kneading Section>

In the present invention, the first kneading section indicates a section that is located on the downstream side relative to the first supply section but on the upstream side relative to the second supply section and can perform kneading of the material. The first kneading section comprises at least one paddle on the rotary shaft and can knead the material supplied from the first supply section to provide an intermediate mixture.

In the first kneading section, the intermediate mixture can be conveyed to the second supply section by a screw, etc. on the rotary shaft.

(Forward Kneading Section)

In the present invention, the forward kneading section indicates a section that is a constituent element of the first kneading section and can knead the material supplied from the first supply section. The forward kneading section comprises at least one paddle on the rotary shaft and can knead the material supplied from the first supply section to provide an intermediate mixture.

In the forward kneading section, the material can be conveyed to the reverse kneading section by a screw, etc. on the rotary shaft.

(Reverse Kneading Section)

In the present invention, the reverse kneading section indicates a section that is a constituent element of the first kneading section and can knead the material supplied from the forward supply section and apply a force to the material in the upstream direction. The reverse kneading section applies a force in the upstream direction to the material and can thereby increase the filling factor of the material in the first kneading section and promote the kneading.

The material supplied from the forward kneading section is forced by the material supplied from the upstream to be conveyed downstream while being subject to a force in the upstream direction by the reverse kneading section.

(Additional Kneading Section)

The first kneading section may further comprise at least one additional kneading section on the downstream side relative to the reverse kneading section. In the case of further comprising an additional kneading section, the additional kneading section is a constitutional element of the first kneading section. By providing an additional kneading section, the solid electrolyte can be reliably milled. From the viewpoint of more reliably milling the solid electrolyte, the first kneading section preferably comprises a plurality of additional kneading sections.

The additional kneading section comprises an additional forward kneading section on the upstream side and an additional reverse kneading section on the downstream side. That is, the additional forward kneading section and the additional reverse kneading section are constituent elements of the additional kneading section. By providing an additional forward kneading section and an additional reverse kneading section in the additional kneading section, the solid electrolyte can be reliably milled. The additional forward kneading section and the additional reverse kneading section are described below.

(Additional Forward Kneading Section)

In the additional forward kneading section, the material conveyed from the upstream is kneaded to be conveyed downstream. The additional forward kneading section comprises at least one paddle on the rotary shaft and can knead the material supplied from the upstream. In the additional forward kneading section, the material can be conveyed to the additional reverse kneading section by a screw, etc. on the rotary shaft.

In the case of comprising one additional kneading section, the upstream of the additional forward kneading section is the reverse kneading section. In the case of comprising two or more additional kneading sections, the upstream of the most-upstream additional kneading section is the reverse kneading section, and the upstream of the additional kneading section other than the most-upstream additional kneading section is the additional reverse kneading section.

(Additional Reverse Kneading Section)

In the additional reverse kneading section, the material supplied from the additional forward kneading section is kneaded, and a force in the upstream direction is applied to the material, whereby the filling factor of the material in the additional kneading section can be increased and the filling factor of the material in the first kneading section as a whole can be increased.

The material supplied from the additional forward kneading section is forced into the material supplied from the additional forward kneading section to be conveyed downstream while being subject to a force in the upstream direction by the additional reverse kneading section.

In the case of comprising one additional kneading section, the downstream of the additional reverse kneading section is the second supply section. In the case of having two or more additional kneading sections, the downstream of the most-downstream additional kneading section is the second supply section, and the downstream of the additional kneading section other than the most-downstream additional kneading section is the additional forward kneading section.

<Second Supply Section>

In the present invention, the second supply section indicates a section that is located on the downstream side relative to the first kneading section but on the upstream side relative to the second kneading section and can perform supply of the material. In the second supply section, at least a part of an electrode active material can be supplied to the intermediate mixture within the barrel, and optionally at least a part of other materials such as solid electrolyte, conduction aid, dispersion medium and binder can be supplied.

The material supplied into the barrel in the second supply section can be conveyed to the second kneading section by a screw, etc. on the rotary shaft.

<Second Kneading Section>

In the present invention, the second kneading section indicates a section that is located on the downstream side relative to the second supply section and can perform kneading of the material. The second kneading section comprises at least one paddle on the rotary shaft and can knead the intermediate mixture kneaded in the first kneading section and the material supplied from the second supply section to produce a mixture for electrode active material layer.

If an excessive shear energy is imparted to the electrode active material, the properties of the electrode active material deteriorate. For this reason, it is preferable not to excessively increase the filling factor of the material in the second kneading section. In the most downstream portion of the second kneading section, a screw directed to cause the material to reversely flow from downstream to upstream (hereinafter, sometimes referred to as "reverse screw"), etc. is provided on the rotary shaft so that the filling factor of the material in the second kneading section (40) can be maintained at a level that is not excessively high.

<Material Supply Buffering Section>

The continuous extrusion kneader of the present invention may further comprises a material supply buffering section between the most downstream portion of the first kneading section and the most upstream portion of the second supply section.

In the material supply buffering section, while kneading the material conveyed from the first kneading section, the material during kneading is forced by the material supplied from the first kneading section to be conveyed to the second supply section.

The most downstream portion of the first kneading section comprises a reverse kneading section or an additional reverse kneading section. In the reverse kneading section or additional reverse kneading section, a force in the upstream direction is applied to the material during kneading. On the other hand, in the second supply section, the material supplied into the barrel is conveyed to the second kneading section by a screw, etc. on the rotary shaft. Even when a force in the upstream direction is applied to the material in the reverse kneading section or additional reverse kneading section, the material from the reverse kneading section or additional reverse kneading section is sometimes drawn into the second supply section by a screw in the second supply section. Then, a material supply buffering section is provided between the most downstream portion of the first kneading section and the most upstream portion of the second supply section, whereby the material in the reverse kneading section or additional reverse kneading section can be prevented from being drawn in by a screw, etc. in the second supply section. As a result, the intermediate mixture containing an insufficiently milled solid electrolyte can be prevented from being conveyed from the first kneading section to the second supply section. In addition, the filling factor of the material can be expected to increase in the first kneading section as a whole.

<Mixture for Electrode Active Material Layer>

The mixture for electrode active material layer indicates a mixture for cathode active material layer in a positive electrode and indicates a material for anode active material layer in a negative electrode. The mixture for cathode active material layer contains a cathode active material and a solid electrolyte and in addition, optionally contains additives, such as conduction aid, binder and dispersion medium. The mixture for anode active material layer contains an anode active material and a solid electrolyte and, in addition, optionally contains additives, such as conduction aid, binder and dispersion medium.

(Cathode Active Material)

The cathode active material may be any material capable of storing an ion such as lithium, sodium and calcium at the time of discharging and any material capable of optionally releasing the ion at the time of charging. In the case of a lithium ion battery, the cathode active material is not limited but includes, for example, a layered lithium metal oxide such as $LiCoO_2$, $LiNiO_2$ and $LiNi_{1/3}Mn_{1/3}Co_{1/3}O_2$, a spinel-type lithium metal oxide such as $LiMn_2O_4$, $Li(Ni_{0.25}Mn_{0.75})_2O_4$, $LiCoMnO_4$ and $Li_2NiMn_3O_8$, an olivine-type lithium metal oxide such as $LiCoPO_4$, $LiMnPO_4$ and $LiFePO_4$, and an NASICON-type lithium metal oxide such as $Li_3V_2P_3O_{12}$.

In addition, for the cathode active material, a coated cathode active material can be used. The coating of the cathode active material is not particularly limited as long as it is a material having ion conductivity, but examples thereof include a metal oxide. For example, in the case of a lithium ion battery, the coating can be formed of a lithium ion-conducting oxide represented by the formula $Li_xAO_y$, for example, a metal oxide such as $Li_3BO_3$ and $LiNbO_3$.

This coating can be expected to produce an effect of enabling, for example, suppressing an elution of the cathode active material at the time of discharging/charging or a reaction of the cathode active material with the solid electrolyte.

(Anode Active Material)

The anode active material may be any material capable of releasing an ion such as lithium, sodium and calcium at the time of discharging and any material capable of optionally storing the ion at the time of charging. The anode active material is not limited but includes, for example, a carbon material, a metal oxide material, and a metal material. The carbon material is not limited as long as it is a material containing carbon, but examples thereof include graphite, mesocarbon microbead (MCMB), high orientation pyrolytic graphite (HOPG), hard carbon, and soft carbon, etc.

For the anode active material as well, a coated anode active material can be used. The coating of the anode active material is not particularly limited as long as it is a material having ion conductivity, but examples thereof include an amorphous carbon coating on graphite. Such coating can be expected to produce an effect of, for example, reduction in the irreversible capacity, i.e., the difference between discharge capacity and charge capacity.

(Solid Electrolyte)

The solid electrolyte can be any material that has ion conductivity and is solid at normal temperature, for example, at 15 to 25° C. The solid electrolyte includes, for example, a sulfide solid electrolyte, an oxide solid electrolyte, and an oxynitride solid electrolyte, etc.

The sulfide solid electrolyte is not limited but, for example, in the case of a lithium ion battery, examples thereof include an $Li_2S-P_2S_5$ system, etc. More specifically, the sulfide solid electrolyte includes $Li_2S-P_2S_5$, $LiI-Li_2S-P_2S_5$, etc.

(Dispersion Medium)

The dispersion medium is not particularly limited but includes, for example, an organic dispersion medium such as butyl butyrate, dibutyl ether and heptane, etc.

(Conduction Aid)

The conduction aid is not particularly limited as long as it is a material having electrical conductivity and capable of enhancing the electron conductivity of the electrode active material, but the conduction aid includes a carbon material such as carbon black (CB), e.g., acetylene black (AB), Ketjen black (KB), carbon fiber (CF), carbon nanotube (CNT), and carbon nanofiber (CNF), etc.

(Binder)

The binder is not particularly limited as long as it can immobilize a material such as cathode active material, etc, but examples thereof include a fluorine-containing binder such as polyvinylidene fluoride (PVdF) and polytetrafluoroethylene (PTFE), a rubber-based binder such as butadiene rubber (BR) and styrene butadiene rubber (SBR), and an acrylic binder, etc.

<<Production Method>>

<Production Method of Mixture for Electrode Active Material Layer>

The method of the present invention for producing a mixture for electrode active material layer is a method for producing a mixture for electrode active material layer by using the continuous extrusion kneader of the present invention and is a method comprising letting at least a part of the solid electrolyte be supplied to the first supply section and kneaded in the first kneading section to provide an intermediate mixture, and letting at least a part of the electrode active material be supplied to the intermediate mixture in the second supply section and kneaded in the second kneading section to provide a mixture for electrode active material layer.

<Production Method of Electrode Laminate>

The method of the present invention for Producing an electrode laminate is a method comprising producing a mixture for electrode active material layer by the method of the present invention and applying the mixture for electrode active material layer onto an electrode current collector to form an electrode active material layer.

The electrode laminate comprises an electrode current collector and an electrode active material layer and indicates a cathode laminate in a positive electrode and an anode laminate in a negative electrode.

The electrode current collector has a function of collecting current from the electrode active material layer. The form of the electrode current collector is not limited but includes, for example, a foil, a plate, a mesh, and a porous body, etc. The material of the electrode current collector is not limited but includes, for example, a stainless steel and a metal or alloy of Al, Cu, Cr, Au, Pt, Fe, Ti or Zn, etc.

The method for applying the mixture is not particularly limited as long as it is a method for forming a uniform electrode active material layer, and examples thereof include a doctor blade method, etc.

<Production Method of All-Solid Battery>

The method of the present invention for producing an all-solid battery is a method comprising producing an electrode laminate by the method of the present invention and stacking the electrode laminate on the solid electrolyte layer.

The all-solid battery has at least one cell structure in which a cathode current collector, a cathode active material layer, a solid electrolyte layer, an anode active material layer, and an anode current collector are stacked in this order.

The method for stacking the laminate may be any method and comprises, for example, a pressing method such as uniaxial pressing, cold isostatic pressing (CIP) and roll pressing, etc.

<<Embodiments>>

The embodiments are described below by referring to the drawings, but the present invention is not limited to the following embodiments.

<First Embodiment>

FIG. 1 is a schematic diagram of the continuous extrusion kneader for producing a mixture for electrode active material layer according to a first embodiment. In this embodiment, the continuous extrusion kneader may be a twin-screw continuous extrusion kneader (100) comprising a hollow barrel (1) and two rotary shafts (2) provided at predetermined intervals within the barrel. The twin-screw extrusion kneader (100) may comprise, from upstream toward downstream, a first supply section (10) for supplying at least a part of a solid electrolyte, a first kneading section (20) for kneading the material supplied from the first supply section to provide an intermediate mixture, a second supply section (30) for supplying at least a part of an electrode active material to the intermediate mixture, and a second kneading section (40) for kneading the intermediate mixture and the material supplied from the second supply section, and the first kneading section may comprise a forward kneading section (21) for kneading the material supplied from the first supply section and conveying the material downstream, and a reverse kneading section (22) for kneading the material supplied from the forward kneading section (21) and applying a force in the upstream direction.

Figure 2:
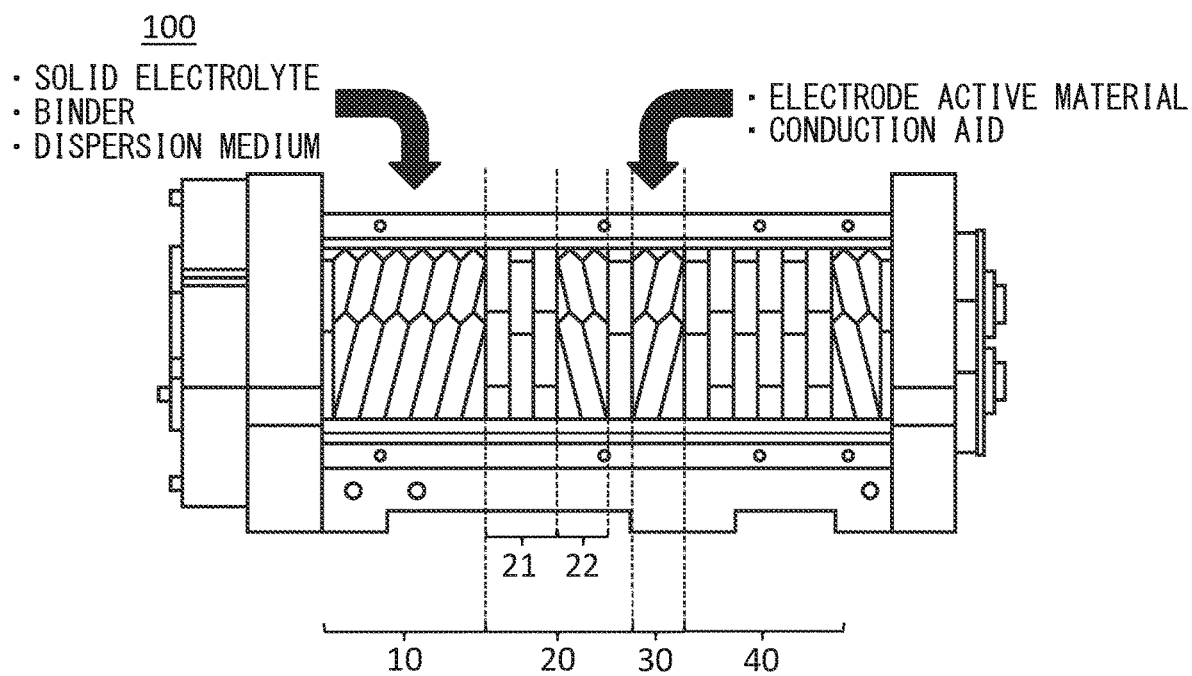
FIG. 2 A diagram illustrating the material supply step in the continuous extrusion kneader according to the first embodiment of the present invention.

FIG. 2 is a diagram illustrating the material supply step in the continuous extrusion kneader (100) according to the first embodiment. In the first supply section (10), a solid electrolyte, a binder and a dispersion medium may be supplied into the barrel, and in the second supply section (30), an electrode active material and a conduction aid may be supplied into the barrel.

In the first supply section (10), the material supplied can be conveyed to the first kneading section (20) by a screw (3a) provided on the rotary shaft (2).

FIGS. 3(a) to (c) depict a diagram illustrating the first kneading section (20) in the continuous extrusion kneader (100) according to the first embodiment.

FIG. 3(b) shows a cross-sectional view of the forward kneading section (21) in an A-A cross-section illustrated in FIG. 3(a). In the forward kneading section (21), a substantially triangular paddle (4) illustrated, which is provided on the rotary shaft (2), can knead a material by applying a shear force to the material.

In the reverse kneading section (22), the reverse screw (3b) illustrated in FIG. 3(c), which is provided on the rotary shaft (2), can apply a force in the upstream direction to the material supplied from the forward kneading section (21). In the reverse kneading section (22), applying a force in the upstream direction leads to increasing the filling factor of the material in the first kneading section (20) and promoting the kneading, as a result, the kneading of the solid electrolyte is sufficiently performed. Here, the material supplied from the forward kneading section (21) can be forced by the material supplied from the first supply section (10) to be conveyed to the second supply section (30) while being subject to a force in the upstream direction by the reverse kneading section (22).

In the second supply section (30), the screw (3a) provided on the rotary shaft (2) can convey the intermediate mixture and the material supplied, to the second kneading section (40).

In the second kneading section (40), the paddle (4) provided on the rotary shaft (2) can apply a shear force to the intermediate mixture and the material supplied in the second supply section (30), and the material can thereby be kneaded to provide a mixture used for the active material layer of a battery.

<Second Embodiment>

Figure 5:
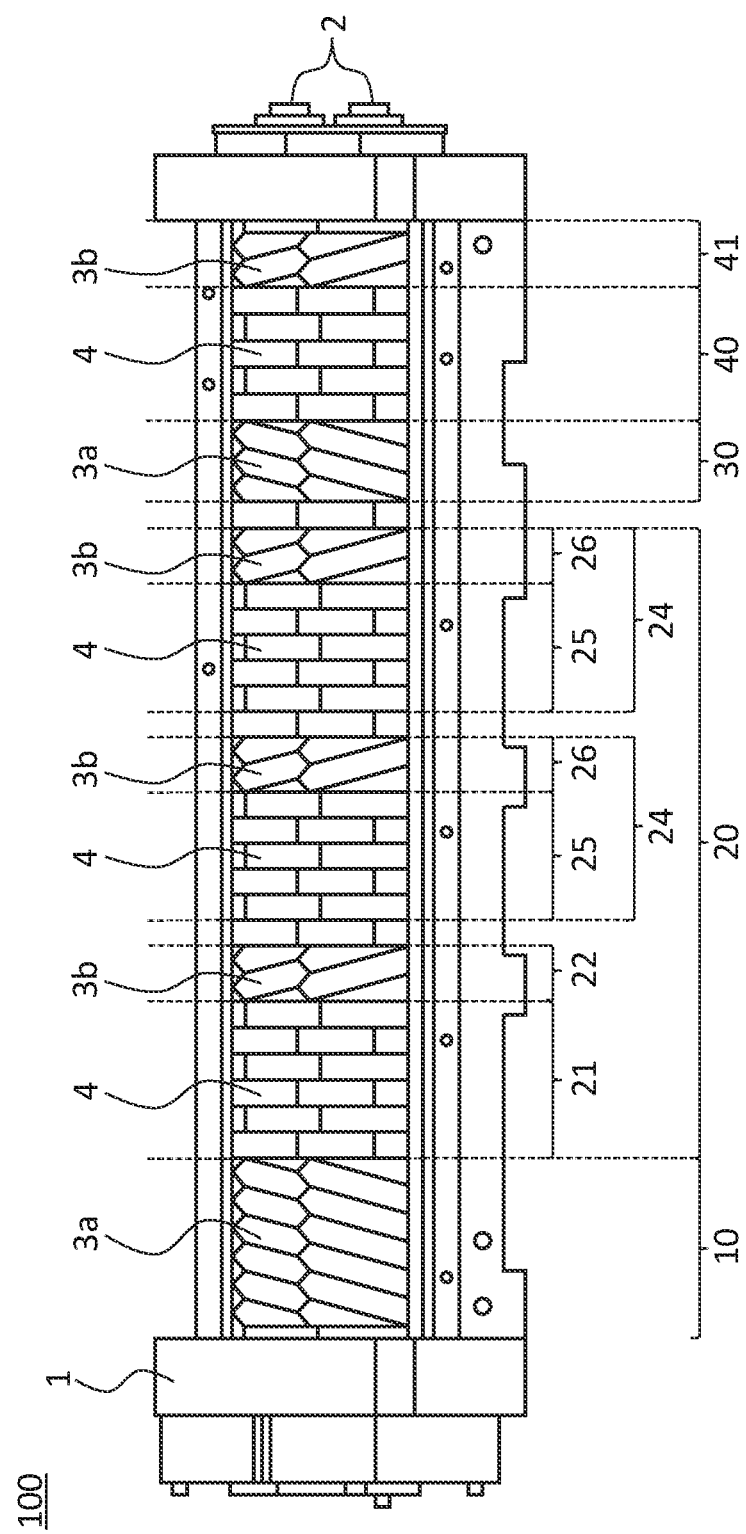
FIG. 5 A schematic diagram of the continuous extrusion kneader for producing a mixture for electrode active material layer according to a second embodiment of the present invention.

FIG. 5 is a schematic diagram of the continuous extrusion kneader for producing a mixture for electrode active material layer according to a second embodiment. Here, the difference from the continuous extrusion kneader according to the first embodiment illustrated in FIG. 1 is described. In FIG. 5, as with FIG. 1, the left side is the upstream side, and the right side is the downstream side.

In the second embodiment illustrated in FIG. 5, the first kneading section (20) comprises an additional kneading section (24) on the downstream side relative to the reverse kneading section (22). In the second embodiment illustrated in FIG. 5, the kneading section comprises two additional kneading sections (24), but the present invention is not limited thereto. More specifically, the kneading section may comprise one additional kneading section (24) or two or more additional kneading sections. The larger the number of additional kneading sections (24) is, the higher the filling factor of the first kneading section (20) as a whole is. The effect of increasing the filling factor of the first kneading section (20) as a whole is described later.

The additional kneading section (24) comprises an additional forward kneading section (25) on the upstream side and an additional reverse kneading section (26) on the downstream side.

In the additional forward kneading section (25), the material supplied from the upstream is kneaded and at the same time, conveyed downstream. The structure of the additional forward kneading section (25) may be the same as that of the forward kneading section (21).

In the additional reverse kneading section (26), the material supplied from the additional forward kneading section (25) is kneaded and at the same time, a force in the upstream direction is applied to the material, whereby the filling factor of the material in the additional kneading section (24) as a whole is increased and the filling factor of the material in the first kneading section (20) increases. As a result, kneading is promoted, and the kneading of the solid electrolyte is sufficiently performed.

The structure of the additional reverse kneading section (26) may be the same as that of the reverse kneading section (22). That is, the material supplied from the additional forward kneading section (25) is forced by the material supplied from the additional forward kneading section (25) to be conveyed downstream while being subject to a force in the upstream direction by the additional reverse kneading section (26).

The material after the completion of kneading in the first kneading section (20) is conveyed to the second supply section (30) and subsequently treated in the same manner as in the first embodiment. If desired, in order to maintain the filling factor of the material in the second kneading section (40) at a level that is not excessively high, a reverse screw (3b) may be provided on the rotary shaft (2) in the most downstream portion (41) of the second kneading section (40).

<Third Embodiment>

Figure 6:
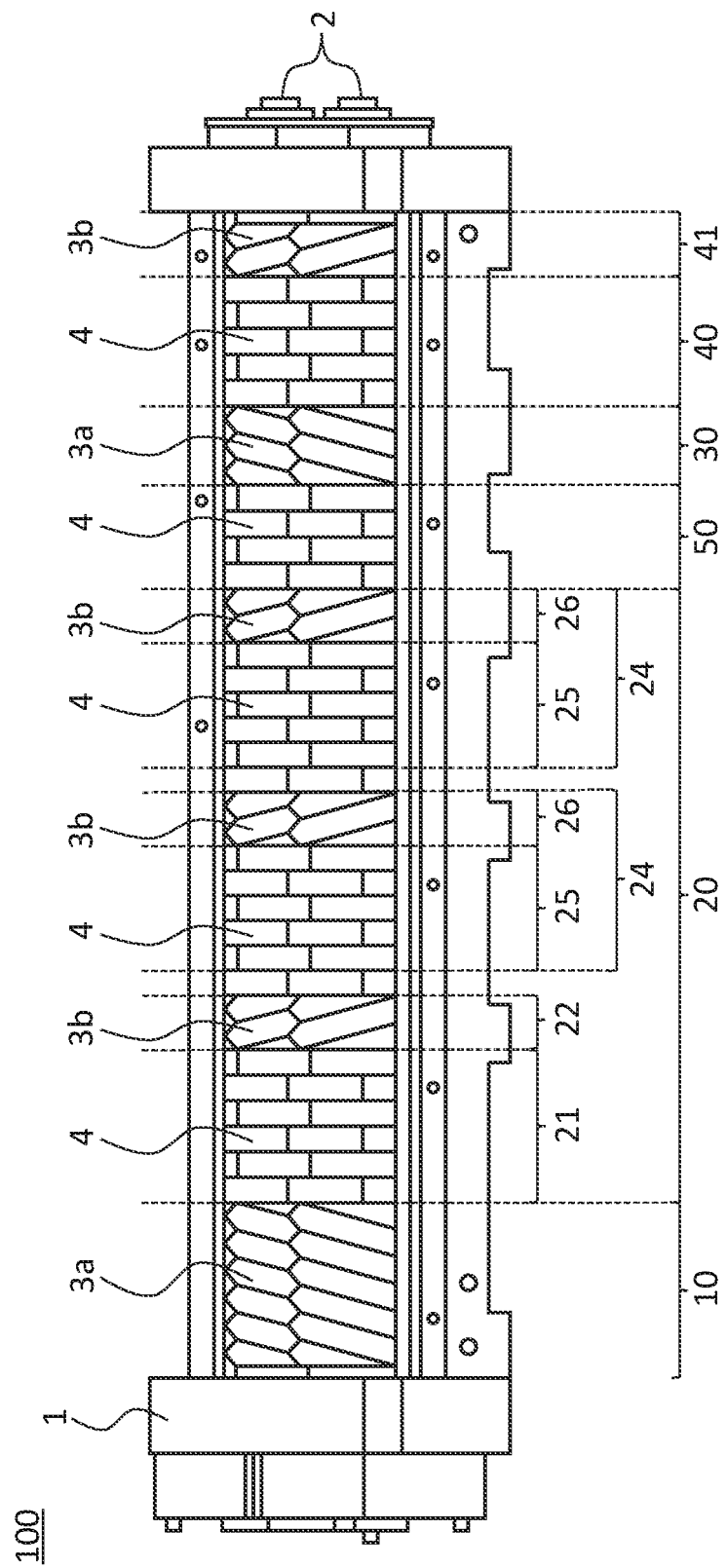
FIG. 6 A schematic diagram of the continuous extrusion kneader for producing a mixture for electrode active material layer according to a third embodiment of the present invention.

FIG. 6 is a schematic diagram of the continuous extrusion kneader for producing a mixture for electrode active material layer according to a third embodiment. Here, the difference from the continuous extrusion kneader according to the second embodiment illustrated in FIG. 5 is described. In FIG. 6, as with FIG. 5, the left side is the upstream side, and the right side is the downstream side.

In the third embodiment, the twin-screw continuous extrusion kneader (100) comprises a material supply buffering section (50) between the most downstream portion of the first kneading section (20) and the most upstream portion of the second supply section (30). In the material supply buffering section (50), the material supplied from the first kneading section (20) is kneaded by the paddle (4). At this time, the material during kneading is conveyed to the second supply section (30) by the material supplied from the first kneading section (20).

The most downstream portion of the first kneading section (20) comprises an additional reverse kneading section (26). In the additional reverse kneading section (26), the reverse screw (3b) applies a force in the upstream direction to the material during kneading. On the other hand, in the second supply section (30), the material supplied into the barrel (1) is conveyed to the second kneading section (40) by the screw (3a) on the rotary shaft (2). By providing the material supply buffering section (50) between the most downstream portion of the first kneading section (20) and the most upstream portion of the second supply section (30), the material in the additional reverse kneading section (26) can be prevented from being drawn in by the screw (3a) of the second supply section (30). As a result, the intermediate mixture containing an insufficiently milled solid electrolyte can be prevented from being conveyed from the first kneading section (20) to the second supply section (30).

<Fourth Embodiment>

The material supply buffering section (50) described in the third embodiment can be applied also to the continuous extrusion kneader in which an additional kneading section (24) is not provided.

Figure 7:
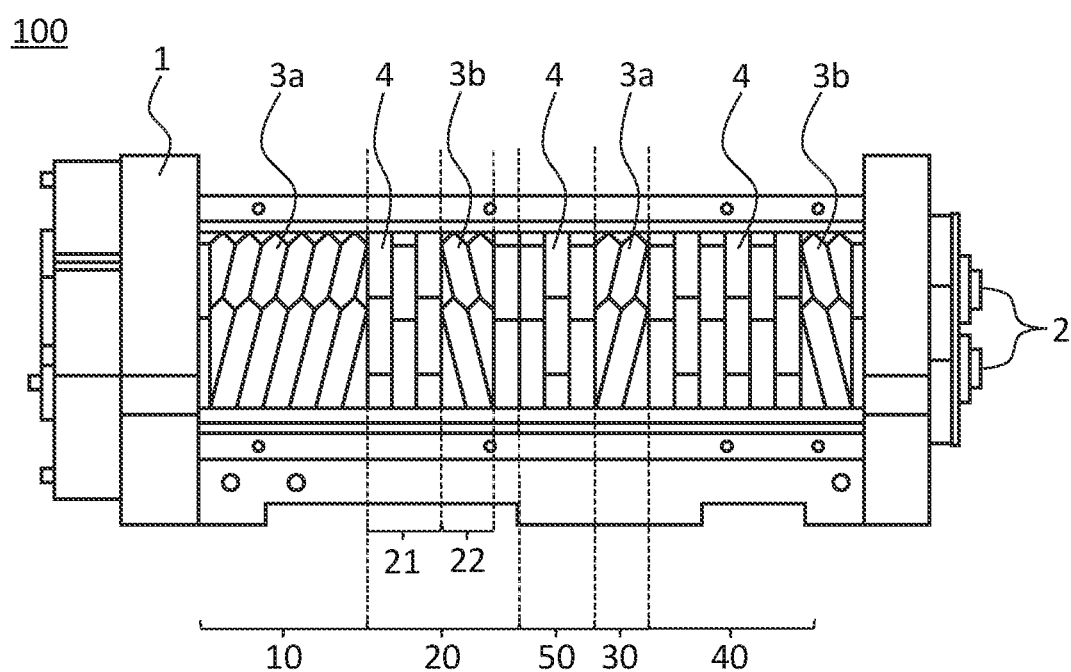
FIG. 7 A schematic diagram of the continuous extrusion kneader for producing a mixture for electrode active material layer according to a fourth embodiment of the present invention.

FIG. 7 is a schematic diagram of the continuous extrusion kneader for producing a mixture for electrode active material layer according to a fourth embodiment. The continuous extrusion kneader according to the fourth embodiment is a kneader fabricated by providing a material supply buffering section in the continuous extrusion kneader of the first embodiment. Here, the difference from the continuous extrusion kneader according to the first embodiment illustrated in FIG. 1 is described. In FIG. 7, as with FIG. 1, the left side is the upstream side, and the right side is the downstream side.

In the fourth embodiment, the twin-screw continuous extrusion kneader (100) comprises a material supply buffering section (50) between the most downstream portion of the first kneading section (20) and the most upstream portion of the second supply section (30). The action and effects of the material supply buffering section (50) are the same as in the third embodiment.

COMPARATIVE EXAMPLE

Figure 4:
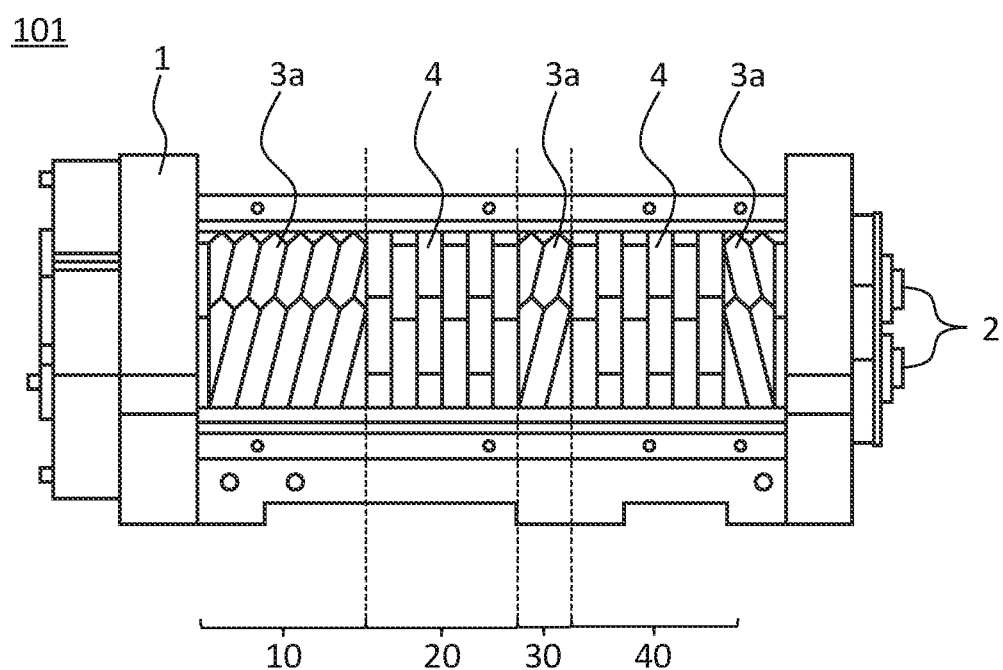
FIG. 4 A schematic diagram of a conventional continuous extrusion kneader for producing a mixture for an electrode active material layer.

FIG. 4 is a schematic diagram of a conventional twin-screw continuous extrusion kneader. In the conventional twin-screw continuous extrusion kneader, for example, a solid electrolyte, etc. are supplied to the first supply section, an electrode active material, etc. are supplied to the second supply section, and these materials are kneaded while being conveyed only in the direction from upstream to downstream, whereby a mixture for active material layer of a battery is produced.

In the twin-screw continuous extrusion kneader of the present invention described in embodiments, compared with the conventional twin-screw continuous extrusion kneader, the filling factor of the material in the first kneading section can be increased, so that a sufficiently kneaded mixture for active material layer can be produced.

DESCRIPTION OF NUMERICAL REFERENCES

1 Barrel
2 Rotary shaft

3a Screw
3b Reverse screw
4 Paddle
10 First supply section
20 First kneading section
21 Forward kneading section
22 Reverse kneading section
24 Additional kneading section
25 Additional forward kneading section
26 Additional reverse kneading section
30 Second supply section
40 Second kneading section
41 Most downstream portion
50 Material supply buffering section
100 Twin-screw continuous extrusion kneader
101 Conventional twin-screw continuous extrusion kneader

What is claimed is:

1. A continuous extrusion kneader for producing a mixture for electrode active material layer, comprising, from upstream to downstream,
a first supply section for supplying at least a part of a solid electrolyte,
a first kneading section for kneading a material supplied from the first supply section to provide an intermediate mixture, wherein the first kneading section comprises a forward kneading section comprising a forward kneading screw for kneading the material supplied from the first supply section and conveying the material downstream, and a reverse kneading screw for kneading the material supplied from the forward kneading section and applying a force to the material in the upstream direction,
a second supply section located downstream of the first kneading section for supplying at least a part of an electrode active material to the intermediate mixture, and
a second kneading section for kneading the intermediate mixture and the material supplied from the second supply section,
wherein the first kneading section is located on the downstream side relative to the first supply section, but on the upstream side relative to the second supply section.

2. The continuous extrusion kneader according to claim 1, wherein the first kneading section further comprises at least one additional kneading section on the downstream side relative to the reverse kneading section, and the additional kneading section comprises an additional forward kneading section for kneading the material supplied from the upstream and conveying the material downstream, and an additional reverse kneading section for kneading the material supplied from the additional forward kneading section and applying a force to the material in the upstream direction.

3. The continuous extrusion kneader according to claim 2, wherein the first kneading section comprises a plurality of additional kneading sections.

4. The continuous extrusion kneader according to claim 1, further comprising, between the most downstream portion of the first kneading section and the most upstream portion of the second supply section, a material supply buffering section in which while kneading the material supplied from the first kneading section, the material during kneading is forced by the material supplied from the first kneading section to be conveyed to the second supply section.

5. The continuous extrusion kneader according to claim 1, wherein in the first supply section, at least one selected from an electrode active material, a conduction aid, a dispersion medium and a binder is further supplied, in addition to the solid electrolyte.

6. The continuous extrusion kneader according to claim 1, wherein in the second supply section, at least one selected from a solid electrolyte, a conduction aid, a dispersion medium and a binder is further supplied, in addition to the electrode active material.

7. The continuous extrusion kneader according to claim 2, further comprising, between the most downstream portion of the first kneading section and the most upstream portion of the second supply section, a material supply buffering section in which while kneading the material supplied from the first kneading section, the material during kneading is forced by the material supplied from the first kneading section to be conveyed to the second supply section.

8. The continuous extrusion kneader according to claim 3, further comprising, between the most downstream portion of the first kneading section and the most upstream portion of the second supply section, a material supply buffering section in which while kneading the material supplied from the first kneading section, the material during kneading is forced by the material supplied from the first kneading section to be conveyed to the second supply section.

* * * * *